United States Patent
Hayashi et al.

(10) Patent No.: US 9,709,169 B2
(45) Date of Patent: Jul. 18, 2017

(54) PISTON RING

(71) Applicant: KABUSHIKI KAISHA RIKEN, Chiyoda-ku, Tokyo (JP)

(72) Inventors: Toshikatsu Hayashi, Kashiwazaki (JP); Kouhei Sugimoto, Kashiwazaki (JP); Yoshinari Watanabe, Kashiwazaki (JP); Hayato Sasaki, Kumagaya (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 75 days.

(21) Appl. No.: 14/233,389

(22) PCT Filed: Oct. 29, 2012

(86) PCT No.: PCT/JP2012/077923
§ 371 (c)(1),
(2) Date: Jan. 17, 2014

(87) PCT Pub. No.: WO2013/065652
PCT Pub. Date: May 10, 2013

(65) Prior Publication Data
US 2014/0225329 A1    Aug. 14, 2014

(30) Foreign Application Priority Data

Oct. 31, 2011   (JP) .................. 2011-239808

(51) Int. Cl.
*C09D 5/00* (2006.01)
*F16J 9/26* (2006.01)
(Continued)

(52) U.S. Cl.
CPC   *F16J 9/26* (2013.01); *C09D 5/00* (2013.01); *C09D 7/1291* (2013.01);
(Continued)

(58) Field of Classification Search
CPC ......... F16J 9/26; B23P 15/08; C23C 14/0641; C23C 14/04; C23C 14/06; C09D 5/00; C09D 7/1291
See application file for complete search history.

(56) References Cited

U.S. PATENT DOCUMENTS 3,936,295 A * 2/1976 Cromwell ........... C22C 32/0047
277/442
4,876,158 A * 10/1989 Onuki ..................... C22C 29/12
277/444

(Continued)

FOREIGN PATENT DOCUMENTS

CN    1493728 A    5/2004
DE    10259380 A1  7/2003
(Continued)

OTHER PUBLICATIONS

International preliminary report on patentability mailed May 15, 2014, corresponds to PCT/JP2012/077923.

*Primary Examiner* — Kristina Fulton
*Assistant Examiner* — Eugene G Byrd
(74) *Attorney, Agent, or Firm* — Hauptman Ham, LLP

(57) ABSTRACT

A piston ring having a resin-based film covering at least one of the upper and lower sides, wherein the resin-based film contains a fibrous filler with a mean fiber diameter of 50 to 500 nm and an aspect ratio of 30 to 500, wherein the fibrous filler in the resin-based film to align roughly parallel to the film surface.

21 Claims, 1 Drawing Sheet

(51) Int. Cl.
  *F02F 5/00* (2006.01)
  *C09D 7/12* (2006.01)
  *C09D 179/08* (2006.01)
  *C08K 7/04* (2006.01)

(52) U.S. Cl.
  CPC .............. *C09D 179/08* (2013.01); *F02F 5/00* (2013.01); *C08K 7/04* (2013.01); *C08K 2201/016* (2013.01)

(56) References Cited

U.S. PATENT DOCUMENTS

| | | | |
|---|---|---|---|
| 5,531,195 A * | 7/1996 | Onoda | F16J 9/26 123/193.6 |
| 5,807,954 A * | 9/1998 | Becker | C08G 18/10 528/25 |
| 5,836,589 A * | 11/1998 | Sakata | C08L 71/00 277/407 |
| 6,416,840 B1 | 7/2002 | Miyamori et al. | |
| 2008/0007006 A1 * | 1/2008 | Kawai | C23C 14/024 277/310 |
| 2008/0039574 A1 | 2/2008 | Nagao et al. | |
| 2011/0098409 A1 | 4/2011 | Burch et al. | |
| 2015/0226327 A1 * | 8/2015 | Sasaki | F02F 5/00 277/442 |

FOREIGN PATENT DOCUMENTS

| | | |
|---|---|---|
| JP | 62233458 A | 10/1987 |
| JP | 63170546 A | 7/1988 |
| JP | 1153867 A | 6/1989 |
| JP | 2298555 A | 12/1990 |
| JP | 763266 A | 3/1995 |
| JP | 10246150 A | 9/1998 |
| JP | 2003183497 A | 7/2003 |
| JP | 2004113435 A | 4/2004 |
| JP | 3596100 B2 | 12/2004 |
| JP | 2005281446 A | 10/2005 |
| JP | 2006225649 A | 8/2006 |
| WO | 2011/053621 A1 | 5/2011 |
| WO | 2011/056651 A2 | 5/2011 |

* cited by examiner

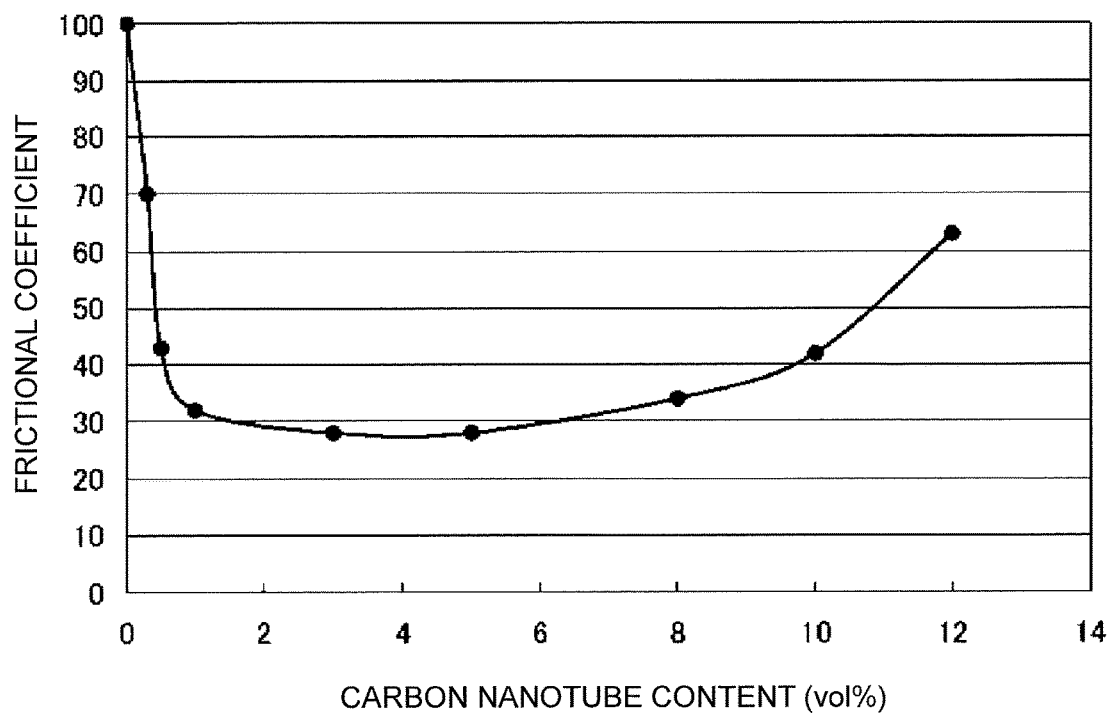

PISTON RING

RELATED APPLICATIONS

The present application is a National Phase of International Application Number PCT/JP2012/077923, filed Oct. 29, 2012, and claims priority from, Japanese Application Number 2011-239808, filed Oct. 31, 2011, the disclosures of which are hereby incorporated by reference herein in their entirety.

TECHNICAL FIELD

The present invention relates to a piston ring, and more specifically, it relates to a piston ring for an internal combustion engine.

BACKGROUND ART

The area near the top ring of a gasoline engine reaches high temperatures of 200° C. or higher due to fuel combustion. In an internal combustion engine, repeated impact occurs between the piston ring and the piston ring groove surface of the piston (hereunder referred to as "ring groove surface") by combustion pressure under such high temperature, while the piston ring surface and the ring groove surface simultaneously slide in the circumferential direction. Such impact and sliding with the piston ring under high temperature causes fatigue fracture on the ring groove surface and dropping off of protrusions on the surface, exposing a fresh active aluminum alloy surface on the ring groove surface. Also, the fresh aluminum alloy surface exposed on the fallen aluminum alloy strips and in the ring groove contacts with the top side and bottom side of the piston ring impacting with the piston ring, and results in even more sliding. This causes the aluminum alloy strips to adhere onto the sides of the piston ring, creating a state of "aluminum adhesion" in which the piston ring body becomes anchored to the fresh aluminum alloy surface of the piston. The aluminum adhesion continues as long as fresh aluminum alloy surface continues to be exposed, and progressive aluminum adhesion results in fixation of the piston ring onto the piston in the ring groove, which impairs the seal performance of the piston ring. Loss of the gas seal function, which is one of the seal performances, results in a blowby phenomenon in which high-pressure combustion gas bleeds out from the combustion chamber into the crankcase, and this can lead to lower engine output. Also, loss of the oil seal function leads to increased oil consumption. Furthermore, aluminum adhesion results in progressive ring groove wear and loss of the seal property between the top and bottom sides of the piston ring and the ring groove surface, leading to increase in amount of blowby.

Many methods have been proposed in the past to suppress aluminum adhesion, such as methods of avoiding direct contact between the base material of the piston, i.e. the aluminum alloy, and the piston ring, and especially the top ring, and methods of alleviating impact of the piston ring on the ring groove.

As one countermeasure on the piston side, Patent Literature 1 describes a method of performing anode oxidizing treatment (alumite treatment) of the ring groove surface, and filling a lubricating substance into the micropores produced by the treatment. Alumite treatment forms a hard film composed mainly of aluminum oxide on the ring groove surface, and therefore suppresses fall-off of aluminum alloy which is the base material of the piston, and minimizes adhesion onto the piston ring. However, the cost necessary for anode oxidizing treatment of the piston is high, and aluminum oxide, being hard, is associated with the problem of poor initial fitting properties.

On the other hand, as a countermeasure on the piston ring side, Patent Literature 2, for example, describes a method of forming on the piston ring sides, a film comprising molybdenum disulfide or the like, as a solid lubricant, dispersed in polyamide, polyimide or the like as a heat-resistant resin. In the construction described in Patent Literature 2, the solid lubricant in the film undergoes cleavage and wear, the frictional coefficient of the film is lowered, attack on the ring groove is alleviated and aluminum adhesion is minimized. Also, Patent Literature 3 teaches that forming a polybenzimidazole resin film containing a solid lubricant on the top and bottom sides of the piston ring can effectively suppress the aluminum adhesion phenomenon. Patent Literature 3 also indicates that carbon fibers or glass fibers can also be added instead of a solid lubricant.

With increasingly high output of engines in recent years, higher temperatures are being reached in the area near the top ring. Because of this situation, fatigue fracture is becoming more common due to lower piston strength, and it is becoming difficult to maintain the resin films covering piston rings for long periods. Although a solid lubricant is added as an essential component in Patent Literature 2, the solid lubricant itself undergoes cleavage and wear, as mentioned above, thereby lowering the frictional coefficient of the film and alleviating attack on the ring groove. Consequently, the wear resistance of the film is lower, and it is difficult to maintain the film for long periods and to sustain an effect of suppressing aluminum adhesion. In addition, there are limits to the amount of solid lubricant that may be added to minimize such film wear, and hence limits on the degree to which frictional coefficient of the film can be reduced. Consequently, the surface of the piston material whose hardness has been reduced under high temperature becomes roughened, and this can cause even further aluminum adhesion.

With the film of Patent Literature 3 as well, a solid lubricant is added as an essential component, and therefore the wear resistance of the film is lower, and it is difficult to maintain the film for long periods and to sustain an effect of suppressing aluminum adhesion. Thus, it has also been considered to add carbon fibers or glass fibers for the purpose of increasing the wear resistance and strength of the film. However, ordinary carbon fibers such as polyacrylonitrile (PAN)-based carbon fibers, pitch-based carbon fibers and cellulose-based carbon fibers, or glass fibers, have fiber diameters of 5 to 10 μm. When filler with such a large fiber diameter is added, and the ends of the filler protrude through the film surface, this can potentially cause damage and wear on the surface of the ring groove. In addition, when filler with such a fiber diameter is added, the film becomes thickened. However, there are limits to the initial film thickness, since suitable clearance must be provided between the piston ring side and the ring groove, and it is not desirable to thicken the film in order to minimize increase in the blowby or oil consumption that result from increased clearance after attrition of the film.

Under the current circumstances, therefore, it has not been possible to obtain a piston ring that can sustain an excellent effect of suppressing aluminum adhesion over long periods for high-output engines.

PRIOR ART LITERATURE

Patent Literature

Patent Literature 1: Japanese Unexamined Patent Application Publication No. 63-170546
Patent Literature 2: Japanese Unexamined Patent Application Publication No. 62-233458
Patent Literature 3: Japanese Unexamined Patent Application Publication No. 7-63266

SUMMARY OF INVENTION

Technical Problem

It is therefore an object of the present invention to solve these problems and provide a piston ring that can sustain an effect of suppressing excellent aluminum adhesion over long periods for high-output engines.

Solution to Problem

As a result of much diligent research in light of the problems described above, the present inventors have found that by covering a piston ring with a resin-based film containing a fine fibrous filler having a specific mean fiber diameter and aspect ratio, it is possible to drastically lower the frictional coefficient in lubricant oil and effectively reduce attack on counterpart materials, and that the film has high wear resistance and toughness and can therefore sustain an effect of suppressing aluminum adhesion for long periods, and on this basis we have devised this invention. In other words, the piston ring of the invention is a piston ring having a resin-based film covering either or both the upper and lower sides, wherein the resin-based film contains a fibrous filler with a mean fiber size of 50-500 nm and an aspect ratio of 30-500.

Advantageous Effects of Invention

In a piston ring of the invention, covered with a resin-based film containing a fine fibrous filler, wear proceeds from the soft resin section by initial sliding with the piston material, and the fibrous filler is exposed on the film surface. Since the fibrous filler is arranged roughly parallel to the film surface, the sides (body sections) of the fibrous filler are exposed, forming a suitable oil film on the worn surface of the surrounding resin sections. In the piston ring of the invention, therefore, the frictional coefficient in lubricant oils is low and wear of counterpart materials can be drastically reduced. The film of the invention in which a fibrous filler is dispersed has high toughness and wear resistance, and therefore maintains these properties without loss even during prolonged operation. A piston ring strikes the ring groove surface with its sides due to up-down movement and combustion pressure of the piston, undergoing powerful stress by striking and sliding, but according to the invention, this stress is diffused by the fine fibrous filler interspersed on the film surface, while also being alleviated by the flexible resin material matrix. In addition, since the piston material slides in contact with the smooth sides of the fibrous filler with a piston ring of the invention, an ideal conformable interface is formed with the piston material surface at the initial stage, after which the film is maintained for long periods without wear of counterpart materials, so that an excellent effect of suppressing aluminum adhesion can be continuously exhibited.

BRIEF DESCRIPTION OF DRAWINGS

FIG. 1 is a graph showing the relationship between carbon nanotube content in the resin-based film and the frictional coefficient in lubricant oil.

DESCRIPTION OF EMBODIMENTS

The piston ring of the invention will be explained in greater detail.
(1) Piston Ring Base Material
The base material of the piston ring of the invention is not particularly restricted, but it preferably has a prescribed strength since impact with the ring groove occurs repeatedly. Preferred materials include steel, martensite stainless steel, austenite stainless steel and high-grade cast iron.
(2) Piston Ring Ground Layer Treatment
In order to improve the adhesiveness of the film of the invention with the piston ring base material, a phosphate film may be formed on the piston ring base material surface. The phosphate film may be, for example, a zinc phosphate-based, manganese phosphate-based or calcium phosphate-based film. A chemical conversion treatment film or oxide film may also be formed in addition to the phosphate film. Since a chemical conversion treatment film cannot be formed on a piston ring in which a hard chromium plating film or electroless nickel plating film has been formed on the base material surface, it is preferred to remove the inorganic contaminants or organic contaminants to ensure adhesiveness of the film. Blast treatment may also be carried out to also serve for adjustment of the surface roughness. The ground layer roughness of the resin-based film of the invention is the ten-point height of irregularities based on JISB0601:'01, $R_{z\_JIS}$, which is preferably 1.0 to 6.0 μm and more preferably 1.5 to 4.5 μm. If the ground layer roughness is in this range, it will be easier for the fibrous filler in the resin-based film to align parallel to the film surface. Thus, addition of a trace amount of fibrous filler can lower the frictional coefficient and minimize protrusion of the fibrous filler, to drastically reduce wear of counterpart materials. A piston ring strikes the ring groove surface with its sides due to up-down movement and combustion pressure of the piston, undergoing powerful stress by striking and sliding, and both the sides and the ring groove become abraded. When wear of the resin-based film of the invention progresses and the ground layer phosphate film and chemical conversion treatment film have been exposed, subsequent wear of the ring groove surface is governed by the ground layer roughness. A smaller ground layer roughness can lower the frictional coefficient, and can effectively reduce wear of the ring groove surface. The ground layer roughness is also a factor influencing the adhesiveness of the film. A larger ground layer roughness increases the surface area contacting with the resin-based film, and can improve adhesiveness by an anchor effect. The ground layer roughness is also preferably within the aforementioned range in order to both reduce wear of the ring groove surface and support adhesiveness of the resin-based film.
(3) Film
The film covering the piston ring of the invention is a resin-based film containing a fibrous filler with a mean fiber diameter of 50 to 500 nm and an aspect ratio of 30 to 500. In such a film, the fine fibrous filler is aligned roughly parallel to the film surface, and initial sliding with the piston material causes wear to proceed from the soft resin section, thereby exposing the side sections of the fibrous filler on the film surface. Under engine operating conditions, a condition occurs in which a suitable amount of oil film is formed on the surface of the resin section worn around the fine fibrous filler, and this can therefore lower the frictional coefficient and drastically reduce wear of counterpart materials. The film of the invention in which the fibrous filler is dispersed has high toughness and wear resistance, and therefore maintains these properties without loss even during prolonged operation. A piston ring strikes the ring groove surface with its sides due to up-down movement and combustion pressure of the piston, undergoing powerful stress by striking and sliding, but according to the invention, this stress is diffused by the fine fibrous filler interspersed on the film surface, while also being alleviated by the flexible resin material matrix. In addition, since the piston material slides in contact with the smooth sides of the fibrous filler with a piston ring of the invention, an ideal conformable interface is formed with the piston material surface at the initial stage, after which the film is maintained for long periods without wear of counterpart materials, so that an excellent effect of suppressing aluminum adhesion can be continuously exhibited.

If the mean fiber diameter of the fibrous filler dispersed in the piston ring of the invention exceeds 500 nm, attack against counterpart materials will tend to increase, and the effect of lowering the frictional coefficient in lubricant oil will be reduced. If the mean fiber diameter of the fibrous filler is less than 50 nm, on the other hand, it will be difficult to achieve uniform dispersion in the resin, and the effect of lowering the frictional coefficient in lubricant oil will be reduced. The mean fiber diameter of the fibrous filler to be dispersed in the piston ring of the invention is preferably 70 nm to 200 nm.

If the aspect ratio of the fibrous filler to be dispersed in the film of the invention exceeds 500, it will be difficult to achieve uniform dispersion in the resin, and the effect of lowering the frictional coefficient in lubricant oil by dispersion of the fine filler will be reduced. If the aspect ratio of the fibrous filler is less than 30, on the other hand, the film-reinforcing effect will be reduced and it will be difficult to maintain the film for prolonged periods, while the effect of smoothing the piston material at the fibrous filler sides will also be reduced. The aspect ratio of the fibrous filler to be dispersed in the piston ring of the invention is preferably 40 to 200.

The fibrous filler content in the film is preferably 0.5 to 10 vol % with respect to the entire film. If the fibrous filler content is within this range, the frictional coefficient of the film in lubricant oil will be further reduced. In addition, the exposed area of the fibrous filler in the film will be optimized, and the effect of smoothing the piston material will be further increased. Furthermore, limiting the fibrous filler content to within this range will bring the matrix resin and fibrous filler in more rigid tight contact, thereby further improving the wear resistance of the film. This will stabilize and sustain the film for longer periods, and allow an excellent effect of suppressing aluminum adhesion to be continuously exhibited. If the fibrous filler content is less than 0.5 vol % there will be no significant effect of lowering the frictional coefficient, and the effect of smoothing the piston material may also be reduced. If it exceeds 10 vol %, on the other hand, the holding power of the fibrous filler in the matrix resin may be reduced and the wear resistance lowered, and this may risk increasing attack on the piston material.

The surface roughness of the resin-based film formed on the piston ring of the invention is preferably no greater than 6.0 µm and more preferably no greater than 4.0 µm, as the ten-point height of irregularities based on JISB0601:'01, $R_{z}$ $_{JIS}$. With a resin-based film having a surface roughness in this range, the fibrous filler will be aligned in a more parallel manner with respect to the film surface. Thus, protrusion of fibers from the film surface is minimized, and wear of the ring groove caused by attack on the ring groove surface by protruding fibers can be effectively reduced.

The fibrous filler to be dispersed in the film of the invention is not particularly restricted so long as it is a material having the aforementioned mean fiber diameter and aspect ratio, and there may be mentioned carbon fibers, silica fibers, boron nitride fibers, alumina fibers, potassium titanate fibers, boron fibers and silicon carbide fibers. Preferred among these are carbon fibers, silica fibers and boron nitride fibers, with carbon fibers being especially preferred for their resistance to adhesion and excellent lubricity, having low reactivity with aluminum-based materials used as piston materials.

When carbon fibers are used as the fibrous filler, they may be either solid fibers or hollow fibers. Hollow fibers may be single-wall carbon nanotubes (SWNTs) or multi-wall carbon nanotubes (MWNTs). Low crystalline carbon nanotubes having an amorphous surface layer are particularly preferred for excellent adhesiveness with the resin material matrix. Commercial carbon nanotube products include VGCF and VGCF-H (by Showa Denko K.K.).

The resin material of the film of the invention is preferably a heat-resistant polymer with an aromatic ring or aromatic heterocyclic ring in the main chain, and since the temperature near the piston ring groove reaches 190° C. or higher, it is suitable to use an amorphous polymer with a glass transition temperature of 190° C. or higher, or a crystalline polymer or liquid crystalline polymer with a melting point of 190° C. or higher. Specifically, this includes mixtures or complexes including at least one from among polyimides (PI), polyetherimides, polyamideimides (PAI), polysulfones, polyethersulfones, polyarylates, polyphenylene sulfides, polyether ether ketones, aromatic polyesters, aromatic polyamides, polybenzimidazoles (PBI), polybenzooxazoles, aromatic polycyanurates, aromatic polythiocyanurates and aromatic polyguanamines. Also, with an organic-inorganic hybrid resin having an inorganic material such as silica, alumina, titania or zirconia dispersed in such a resin material on the molecular level, it is possible to further improve the adhesiveness with base materials, the heat resistance and the strength. Since the temperature near the ring groove can reach 250° C. or higher in some cases, the resin material is preferably highly heat-resistant thermosetting PBI, PI or PAI, and more preferably it is PI in consideration of the frictional coefficient. Also, in order to prepare a coating solution it is preferably soluble in organic solvents, and preferably PI or PAI, commercially available as varnishes, are used. Commercial products of PI include U-Varnish-A and U-Varnish-S (products of Ube Industries, Ltd.), the HCl Series (product of Hitachi Chemical Co., Ltd.), FC-114 Fine Polyimide Varnish (products of Fine Chemical Japan Co., Ltd.), H850D (product of Arakawa Chemical Industries, Ltd.), and RC5057, RC5097 and RC5019 (products of I.S.T Co., Ltd.). For PAI, products include the HPC Series (product of Hitachi Chemical Co., Ltd.) and VYLOMAX (product of Toyobo, Ltd.), and the COMPOCERAN H800 and H900 Series (products of Arakawa Chemical Industries, Ltd.), which are hybrid resins with silica in polyimide or polyamideimide.

In addition to a fibrous filler, there may also be dispersed in the film of the invention a fluorine-based resin powder such as polytetrafluoroethylene (PTFE). Fluorine-based resin powders include, in addition to PTFE, also tetrafluoroethylene-perfluoroalkylvinyl ether copolymer (PFA), tetrafluoroethylene-hexafluoropropylene copolymer (FEP), tetrafluoroethylene-ethylene copolymer (ETFE) and polychlorotrifluoroethylene (PCTFE). These products are preferably fine products, and preferably have mean particle sizes of 0.1 to 1 μm. The content of a fluorine-based resin powder is preferably 1 to 10 vol % and more preferably 2 to 5 vol % with respect to the entire film. If the fluorine-based resin powder is added within this range, the frictional coefficient can be further reduced while maintaining the excellent wear resistance of the film. Commercial PTFE powder products include KTL-500F (mean particle size: 0.3 μm, product of Kitamura, Ltd.), and Disperse EZ-200 (mean particle size: 0.2 μm, product of Techno Chemical Corp.).

The thickness (single-side) of the film covering the piston ring of the invention is preferably 2 to 30 μm and more preferably 4 to 20 μm. If the thickness of the film is less than 2 μm, the film will undergo attrition until the surface of the ring groove becomes smoothed, and it may not be possible to sufficiently exhibit an effect of suppressing aluminum adhesion. If the thickness of the film exceeds 30 μm, inconveniences may occur when the piston ring is mounted in the ring groove, and it will not be cost-effective.

The effect of the invention can also be obtained by covering the film on at least one side, either the upper or lower side, of the piston ring, but a more excellent aluminum adhesion-suppressing effect can be exhibited by covering the lower side.

(4) Method of Forming Film

The method of forming a film according to the invention is not particularly restricted, and known methods such as spray coating, spin coating, roll coating, dip coating and printing methods may be employed. Printing methods are preferred from the viewpoint of excellent coating efficiency and minimizing coating spots. For convenience, spray coating is preferred from the viewpoint of facilitating control of the state of alignment of the fibrous filler. In spray coating, a spray pressure suitable for the film may be selected to allow parallel alignment of the fibrous filler.

The method of preparing the coating solution or ink is not particularly restricted, and for example, preferably the fibrous filler is dispersed in a varnish such as a commercially available polyimide, and then a solvent added if necessary for adjustment to the optimal viscosity. The solvent or additives used to adjust the viscosity of the coating solution or ink may be appropriately selected depending on the coating method or printing method. The dispersion method is not particularly restricted, and known methods employing a sand mill, bead mill, ball mill or roll mill may be used. If necessary, a dispersing agent may be added as appropriate. By uniformly dispersing the fibrous filler in the resin, the frictional coefficient in lubricant oils is further reduced and a more excellent effect of smoothing the piston material surface is obtained, while the effect of suppressing aluminum adhesion is also further increased.

After coating with the coating solution or after printing, the processes of drying and curing are carried out. The curing temperature is selected as appropriate depending on the resin material.

EXAMPLES

Although the invention will be further explained with the following examples, the invention is not limited to these examples.

Example 1

A flat test piece and a piston ring were fabricated for an abrasion test, as described below.

[1] Fabrication of Flat Test Piece for Abrasion Test

An SK-3 strip cut to a length of 60 mm, a width of 10 mm and a thickness of 5 mm was polished to an Rz (JIS82) being adjusted to 0.8 μm to 1.5 μm. Next, after alkali degreasing, it was immersed for about 5 minutes in an aqueous manganese phosphate solution that had been heated to approximately 80° C., to form a manganese phosphate film with a thickness of about 2 μm on the entire surface of the abrasion test strip.

[2] Fabrication of Piston Ring

A CrN film with a thickness of approximately 30 μm was formed by ion plating on the peripheral surface of a piston ring made from low-chromium steel. The obtained piston ring was alkali degreased, and then immersed for 5 minutes in an aqueous manganese phosphate solution that had been heated to approximately 80° C., to form a manganese phosphate film with a thickness of about 2 μm on the surface of the piston ring other than the peripheral surface. The surface roughness of the manganese phosphate film, i.e. the ground layer roughness of the resin-based film of the invention, was 2.5 μm as the ten-point height of irregularities $R_{z\ JIS}$ (JISB0601:'01).

[3] Preparation of Coating Solution and Formation of Film

After adding a suitable amount of N-methyl-2-pyrrolidone to polyimide (PI) varnish (U-Varnish by Ube Industries, Ltd.) for dilution, carbon nanotubes were added and mixed therewith, and a high-pressure disperser was used for uniform dispersion of the carbon nanotubes to prepare a coating solution. The carbon nanotubes used were VGCF-H (mean fiber diameter: 120 nm, fiber length: 6 μm, aspect ratio: 50) by Showa Denko K.K., and were prepared to 0.3% with respect to the volume of the entire formed film.

The coating solution was spray coated on one side of the flat test piece and the upper and lower sides of the piston ring, and dried at 100° C. for 10 minutes, and further heated for 1 hour in an electric furnace at 350° C. for curing. The film thickness of the flat plate test piece was approximately 10 μm, and the film thickness of the piston ring (one side) was approximately 5 μm. Also, the surface roughness of each film was 2.3 μm and 2.0 μm, as the ten-point height of irregularities $R_{z\ JIS}$ (JISB0601:'01).

The obtained flat plate test piece was used for measurement of the frictional coefficient and an abrasion test, and the obtained piston ring was used for an engine test (actual use test). The detail for each test were as follows. The results are shown in Table 1. The frictional coefficient and the extent of film wear were expressed as relative values with respect to 100 as the values for Comparative Example 1 described below, covered with a PI film with no added filler.

Examples 2 to 8

A film was formed on one side of a flat plate test piece and the upper and lower sides of a piston ring in the same manner as Example 1, except that the amount of carbon nanotubes added was changed to 0.5 vol % (Example 2), 1 vol % (Example 3), 3 vol % (Example 4), 5 vol % (Example 5), 8 vol % (Example 6), 10 vol % (Example 7) and 12 vol % (Example 8), respectively, with respect to the volume of the entire formed film. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for Comparative Example 1 described below, covered with a PI film with no added filler.

Example 9

Boron nitride nanotubes (BNNT) were produced using Chemical Vapor Deposition (CVD), according to an existing method. Boron and ammonia were used as starting materials. Reaction of boron at 1300° C. in a reaction tube containing magnesium oxide powder produced $B_2O_2$ gas and magnesium particles. By introducing argon gas and ammonia into the reaction tube, BNNT was grown on the magnesium particles. The mean fiber size of the obtained BNNT was 90 nm, the fiber length was 5 μm and the aspect ratio was 55.

A coating solution was prepared and a film was formed on one side of a flat plate test piece and the upper and lower sides of a piston ring, in the same manner as Example 4, except that the carbon nanotubes of Example 4 were replaced with the aforementioned BNNT. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for Comparative Example 1 described below, covered with a PI film with no added filler.

Example 10

Silica nanotubes were produced according to an existing method (Japanese Patent Publication No. 3821223). The silica precursor used was tetraethoxysilane, which was added to helical fibers composed of a pre-synthesized organic material, and adsorbed onto the fiber surfaces. After allowing the reaction mixture to stand for 5 days, diethylamine was added as a reaction catalyst to promote polymerization reaction of tetraethoxysilane, producing silica. Next, the helical fiber was combusted by firing to obtain silica nanotubes. The mean fiber diameter of the obtained silica nanotubes was 70 nm, the fiber length was 10 μm and the aspect ratio was 140.

A coating solution was prepared and a film was formed on one side of a flat plate test piece and the upper and lower sides of a piston ring, in the same manner as Example 4, except that the carbon nanotubes of Example 4 were replaced with the aforementioned silica nanotubes. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for Comparative Example 1 described below, covered with a PI film with no added filler.

Comparative Example 1

A coating solution comprising only PI and solvent, without addition of carbon nanotubes, was used to form a film on one side of a flat plate test piece and the upper and lower sides of a piston ring, in the same manner as Example 1. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for this comparative example.

Comparative Example 2

A film was formed on one side of a flat plate test piece and the upper and lower sides of a piston ring, in the same manner as Example 5, except that Carbon Fibers HT C413 (mean fiber diameter: 6 μm, fiber length: 150 μm, aspect ratio: 25) by Toho Tenax Co., Ltd. were used instead of carbon nanotubes. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for Comparative Example 1.

Comparative Example 3

A film was formed on one side of a flat plate test piece and the upper and lower sides of a piston ring, in the same manner as Example 5, except that FloTube900 (mean fiber diameter: 11 nm, fiber length: 10 μm, aspect ratio: 90) by Cnano Co. were used as the carbon nanotubes. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for Comparative Example 1.

Comparative Example 4

A film was formed on one side of a flat plate test piece and the upper and lower sides of a piston ring, in the same manner as Example 5, except that Artificial Graphite HAG-150 (mean particle size: 0.7 μm) by Nippon Graphite Industries, Ltd. was used instead of carbon nanotubes. The obtained flat plate test piece was used for measurement of the frictional coefficient and an abrasion test, and the obtained piston ring was used for an actual engine test. The results are shown in Table 1. The frictional coefficient and the extent of film wear were expressed as relative values with respect to 100 as the values for Comparative Example 1.

(Measurement of Frictional Coefficient and Abrasion Test)

The frictional coefficient was measured using a reciprocating abrasion tester. Each of the sides of the flat test pieces of Examples 1 to 10 and Comparative Examples 1 to 4 covered with films were pressed with a fixed load using a ϕ4.5 mm aluminum sphere, while reciprocating the test piece under the conditions specified below, and measuring the friction force from an arm strain gauge anchoring the aluminum sphere. The frictional coefficient was calculated from the friction force and test load after 10 strokes. The results are shown in FIG. 1.

Testing temperature: 260° C., stroke: 40 mm, rubbing speed: 70 mm/s, lubrication conditions: lubricant oil, operations: 250 reciprocal operations The wear extent of the film was determined by removing the test piece after the test, eliminating the abrasion dust by ultrasonic cleaning in ethanol, drying, allowing it to cool, using a roughness meter to measure the cross-sectional shape in the short axis direction of the test piece, and calculating the cross-sectional area of the wear tracks generated by the abrasion test. Measurement of the cross-sectional shape was conducted at three locations for each wear track, the cross-sectional area of the largest wear track being recorded as the extent of film wear.

(Engine Test)

The piston rings of Examples 1 to 10 and Comparative Examples 1 to 4 were each mounted in the top ring groove of an aluminum alloy (AC8A-T6) piston, and mounted in a 1.5 liter 4-cylinder engine. The engine was used for 100 to 400 hours of intermittent operation at a rotational speed of 6400 rpm. Following operation, the aluminum adhesion on the piston ring sides and roughening of the top ring groove of the piston were observed. The second ring and oil ring used had the following specifications.

(1) Second Ring
Material: SWOSC-V, Full-surface zinc phosphate treated
(2) Oil Ring
Side rail
Material: JIS G3502 SWRS82A-K, CrN film formed by ion plating on peripheral surface.
Spacer expander
Material: SUS304

The test results are shown in Table 1. The criteria used for the results in Table 1 were as follows.
Groove wear:
None: ○ (circle mark)
Present but minimal: Δ (triangle mark)
Present: x (cross mark)
Adhesion:
Adhesion present: Yes
Adhesion absent: No

TABLE 1

| | Filler | | Frictional co-efficient | Extent of film wear | Engine test | |
|---|---|---|---|---|---|---|
| | Type | Addition (vol %) | | | Groove wear | Adhesion |
| Example 1 | VGCF-H | 0.3 | 65 | 41 | ○ | No |
| Example 2 | | 0.5 | 43 | 15 | ○ | No |
| Example 3 | | 1 | 32 | 8 | ○ | No |
| Example 4 | | 3 | 30 | 5 | ○ | No |
| Example 5 | | 5 | 28 | 0 | ○ | No |
| Example 6 | | 8 | 34 | 10 | ○ | No |
| Example 7 | | 10 | 42 | 15 | ○ | No |
| Example 8 | | 12 | 63 | 48 | ○ | No |
| Example 9 | BNNT | 3 | 28 | 3 | ○ | No |
| Example 10 | Silica nanotubes | 3 | 35 | 8 | ○ | No |
| Comp. Ex. 1 | None | — | 100 | 100 | X | Yes |
| Comp. Ex. 2 | HT C413 | 5 | 110 | 120 | X | Yes |
| Comp. Ex. 3 | FloTube900 | 5 | 90 | 95 | Δ | No |
| Comp. Ex. 4 | HAG-150 | 5 | 78 | 97 | Δ | No |

In Examples 1 to 8 of the invention, wherein covering was with a film containing added carbon nanotubes with a mean particle diameter of 120 nm and an aspect ratio of 50, the frictional coefficients in lubricant oil and degrees of film wear were drastically reduced in all cases, compared to Comparative Example 1 wherein covering was with a PI film containing no added filler. Also, while groove wear and adhesion occurred in Comparative Example 1, none occurred in any of Examples 1 to 8. The reason for this is considered to be as follows. In the films containing carbon nanotubes, initial sliding with the piston material underwent abrasion from the soft resin sections, exposing the fine side sections of the carbon nanotubes on the film surface, and a sufficient oil film formed on the surrounding resin surface. Presumably, this film surface condition optimized sliding with the counterpart material, resulting in a lower frictional coefficient. Furthermore, it is conjectured that the low friction allowed sliding abrasion with the counterpart material to be significantly reduced, and that the high toughness and wear resistance of the films of Examples 1 to 8 in which carbon nanotubes were dispersed were stably maintained even in the abrasion test. In the engine test, on the other hand, an ideal conformable interface formed between the piston material surface due to sliding with the sides of the carbon nanotubes in the initial stage, and low friction was maintained thereafter as well. A piston ring strikes the ring groove surface with its sides due to up-down movement and combustion pressure of the piston, undergoing powerful stress by striking and sliding, but in the examples of the invention, this stress was diffused by the carbon nanotubes interspersed on the film surface, while also being alleviated by the PI matrix. It is therefore conjectured that in the piston ring of the invention, the film was stably maintained without causing wear of the counterpart material (groove), and an excellent effect of suppressing aluminum adhesion was continuously maintained, thereby avoiding groove wear and adhesion. Furthermore, since addition of carbon nanotubes improves the thermal conductivity of a film, it is possible to rapidly release generated heat to the cylinder side. Thus, the minimal temperature increase of the film and the reduced wear are believed to be factors responsible for allowing the film to be maintained for prolonged periods.

FIG. 1 is a graph showing the relationship between carbon nanotube content and frictional coefficient in lubricant oil, for the films of Examples 1 to 8. The ordinate represents the relative value with respect to 100 as the value for Comparative Example 1 in which no carbon nanotubes were added. This shows that with a carbon nanotube content range of 0.5 to 10 vol %, the frictional coefficient was no greater than ½ that of Comparative Example 1, indicating that the frictional coefficient-reducing effect is especially notable in this range. This was attributed to optimization of the exposed area of the carbon nanotubes in the film. In this range, the degree of film wear was also further reduced to no greater than 15% compared to Comparative Example 1. By applying such a film, it should be possible to maintain an effect of suppressing aluminum adhesion for prolonged periods even in high-load engines.

Furthermore, in Example 9 and Example 10 which used BNNT and silica nanotubes, respectively, as the fibrous filler instead of carbon nanotubes, similar reduction in the frictional coefficient and extent of film wear were observed as in Example 4, and no groove wear or adhesion were seen in the engine test.

On the other hand, in Comparative Example 2 which used carbon fibers with a fiber diameter of about 6 μm, the frictional coefficient and extent of film wear were increased over Comparative Example 1, and groove wear and adhesion were seen in the engine test. This is possibly due to the large fiber diameter of the filler which resulted in increased attack on the counterpart material. Also, in Comparative Example 3 which used carbon nanotubes with a fiber diameter of 11 nm, the frictional coefficient and degree of film wear were reduced slightly by 10% and 5%, respectively, compared to Comparative Example 1, but moderate groove wear was seen in the engine test. The cause of this may be that because the carbon nanotubes are microsized, the contact area with the piston material was low and a sufficient lubrication effect was not observed.

Furthermore, in Comparative Example 4 which used carbon powder with a mean particle size of 0.7 μm, the frictional coefficient and extent of film wear were reduced compared to Comparative Example 1, but the percentage reduction was less than in the examples, and moderate groove wear was observed in the engine test.

These results confirmed that addition of a fibrous filler with a prescribed fiber size and aspect ratio is effective for lowering the frictional coefficient of a resin-based film in lubricant oil, and that continuous suppressing of aluminum adhesion for prolonged periods is possible with a piston ring of the invention covered with such a resin film.

The invention claimed is:

1. A piston ring having a resin-based film covering at least one of the upper and lower sides, wherein the resin-based film contains a fibrous filler with a mean fiber diameter of 50 to 500 nm and an aspect ratio of 30 to 500, wherein
the fibrous filler in the resin-based film is aligned at least roughly parallel to a surface of the resin-based film, and
a ground layer roughness of the resin-based film is 1.0 to 6.0 μm, as a ten-point height of irregularities Rz. JIS.

2. A piston ring according to claim 1, wherein the fibrous filler content is 0.5 to 10 vol % with respect to the entire resin-based film.

3. A piston ring according to claim 1, wherein the fibrous filler is at least one type selected from the group consisting of carbon fibers, silica fibers and boron nitride fibers.

4. A piston ring according to claim 2, wherein the fibrous filler is at least one type selected from the group consisting of carbon fibers, silica fibers and boron nitride fibers.

5. A piston ring according to claim 1, wherein the resin-based film is at least one selected from the group consisting of polyimides, polyetherimides, polyamideimides, polysulfones, polyethersulfones, polyarylates, polyphenylene sulfides, polyether ether ketones, aromatic polyesters, aromatic polyamides, polybenzimidazoles, polybenzooxazoles, aromatic polycyanurates, aromatic polythiocyanurates and aromatic polyguanamines.

6. A piston ring according to claim 2, wherein a ground layer roughness of the resin-based film is 1.0 to 6.0 μm, as a ten-point height of irregularities Rz. JIS.

7. A piston ring according to claim 3, wherein a ground layer roughness of the resin-based film is 1.0 to 6.0 μm, as a ten-point height of irregularities Rz. JIS.

8. A piston ring according to claim 4, wherein a ground layer roughness of the resin-based film is 1.0 to 6.0 μm, as a ten-point height of irregularities Rz. JIS.

9. A piston ring according to claim 5, wherein a ground layer roughness of the resin-based film is 1.0 to 6.0 μm, as a ten-point height of irregularities Rz. JIS.

10. A piston ring according to claim 1, wherein a surface roughness of the resin-based film is no greater than 6.0 μm, as a ten-point height of irregularities Rz. JIS.

11. A piston ring according to claim 2, wherein a surface roughness of the resin-based film is no greater than 6.0 μm, as a ten-point height of irregularities Rz. JIS.

12. A piston ring according to claim 3, wherein a surface roughness of the resin-based film is no greater than 6.0 μm, as a ten-point height of irregularities Rz. JIS.

13. A piston ring according to claim 4, wherein a surface roughness of the resin-based film is no greater than 6.0 μm, as a ten-point height of irregularities Rz. JIS.

14. A piston ring according to claim 5, wherein a surface roughness of the resin-based film is no greater than 6.0 μm, as a ten-point height of irregularities Rz. JIS.

15. A piston ring according to claim 1, wherein a surface roughness of the resin-based film is no greater than 6.0 μm, as the ten-point height of irregularities Rz. JIS.

16. A piston ring according to claim 6, wherein a surface roughness of the resin-based film is no greater than 6.0 μm, as the ten-point height of irregularities Rz. JIS.

17. A piston ring according to claim 7, wherein a surface roughness of the resin-based film is no greater than 6.0 μm, as the ten-point height of irregularities Rz. JIS.

18. A piston ring according to claim 8, wherein a surface roughness of the resin-based film is no greater than 6.0 μm, as the ten-point height of irregularities Rz. JIS.

19. A piston ring according to claim 9, wherein a surface roughness of the resin-based film is no greater than 6.0 μm, as the ten-point height of irregularities Rz. JIS.

20. A piston ring having a resin-based film covering at least one of the upper and lower sides, wherein the resin-based film contains a fibrous filler with a mean fiber diameter of 50 to 500 nm and an aspect ratio of 30 to 500, wherein
the fibrous filler in the resin-based film is aligned at least generally parallel to a surface of the resin-based film.

21. A piston ring according to claim 20, wherein
the fibrous filler in the resin-based film is aligned at least substantially parallel to the surface of the resin-based film.

* * * * *